(12) United States Patent
Shibata

(10) Patent No.: US 7,681,321 B2
(45) Date of Patent: Mar. 23, 2010

(54) EYEGLASS FRAME SHAPE MEASURING APPARATUS

(75) Inventor: Ryoji Shibata, Toyokawa (JP)

(73) Assignee: Nidek Co., Ltd., Gamagori-shi (JP)

( * ) Notice: Subject to any disclaimer, the term of this patent is extended or adjusted under 35 U.S.C. 154(b) by 68 days.

(21) Appl. No.: 12/167,864

(22) Filed: Jul. 3, 2008

(65) Prior Publication Data

US 2009/0007444 A1 Jan. 8, 2009

(30) Foreign Application Priority Data

Jul. 4, 2007 (JP) ............................. 2007-176695

(51) Int. Cl.
*G01B 5/20* (2006.01)
(52) U.S. Cl. .......................... 33/200; 33/553
(58) Field of Classification Search ................... 33/200, 33/507, 551, 553, 554
See application file for complete search history.

(56) References Cited

U.S. PATENT DOCUMENTS

| 5,615,486 | A * | 4/1997 | Igarashi et al. ............... 33/200 |
| 6,263,583 | B1 * | 7/2001 | Mizuno ....................... 33/507 |
| 6,325,700 | B1 | 12/2001 | Mizuno et al. |
| 6,478,657 | B1 | 11/2002 | Shibata |
| 6,845,678 | B2 * | 1/2005 | Igarashi et al. ............... 33/200 |
| 2002/0046000 | A1 | 4/2002 | Suzuki |
| 2005/0275802 | A1 | 12/2005 | Nauche et al. |
| 2008/0022539 | A1 * | 1/2008 | Haddadi ....................... 33/200 |
| 2008/0289200 | A1 * | 11/2008 | Jouard ......................... 33/200 |
| 2009/0140036 | A1 * | 6/2009 | Haddadi ....................... 33/200 |

FOREIGN PATENT DOCUMENTS

| EP | 0666139 A1 | 8/1995 |
| FR | 2893723 A1 | 5/2007 |
| JP | 62-215814 A | 9/1987 |
| JP | 2000-314617 A | 11/2000 |
| JP | 2001-18155 A | 1/2001 |
| JP | 2001-174252 A | 6/2001 |
| JP | 2006-350264 A | 12/2006 |

OTHER PUBLICATIONS

Extended European Search Report Oct. 31, 2008.

* cited by examiner

*Primary Examiner*—G. Bradley Bennett
(74) *Attorney, Agent, or Firm*—Sughrue Mion, PLLC

(57) ABSTRACT

An eyeglass frame shape measuring apparatus comprises: a frame holding unit which holds a eyeglass frame in a desired position; a rotary base; a feeler holding unit which comprises a support shaft to which a feeler for measurement is attached, a first arm for holding the support shaft, an elastic body for urging the first arm so that the support shaft is urged outward with respect to a rotation center axis of the rotary base, and a first arm holding unit for holding the first arm to enable the support shaft to be inclined with respect to the rotation center axis; a detecting unit which detects movement of the first arm; and an arithmetic unit which obtains a three-dimensional movement position of the feeler to obtain the three-dimensional shape of the rim, on the basis of rotation of the rotary base and results of detection of the detecting unit.

7 Claims, 6 Drawing Sheets

EYEGLASS FRAME SHAPE MEASURING APPARATUS

BACKGROUND OF THE INVENTION

The present invention relates to an eyeglass frame shape measuring apparatus for measuring a three-dimensional shape of a rim (a lens frame) of an eyeglass frame.

An eyeglass frame shape measuring apparatus, called as a frame tracer, which is so formed that an eyeglass frame is held substantially horizontally by a holding mechanism, and a feeler (a stylus) is moved along a groove of a rim of the frame while it is abutted against the rim groove to detect movement (a position) of the feeler, whereby a three-dimensional shape of the rim is measured, has been heretofore proposed (Reference should be made to Japanese Patent Publications No. JP-A-2000-314617 (U.S. Pat. No. 6,325,700), No. JP-A-2001-174252, No. JP-A-2006-350264 (US2005/0275802), No. JP-A-S62-215814, etc.). Among these related arts, the art now in practical use is the device of a type having a moving base which is rectilinearly moved in a substantially horizontal direction, and a moving shaft which is rectilinearly moved in a vertical direction (a substantially perpendicular direction) with respect to the moving base, in which the feeler is attached to the moving shaft, as disclosed in Japanese Patent Publication No. JP-A-2000-314617 (U.S. Pat. No. 6,325,700).

In order to accurately measure the three-dimensional shape of the rim, it is desirable that the feeler is smoothly moved, while it is abutted against the rim groove with a constant pressure. However, in a rectilinear moving mechanism as provided in the device of Japanese Patent Publication No. JP-A-2000-314617 (U.S. Pat. No. 6,325,700), there is such concern that dust may be likely to enter into the rectilinear moving mechanism, and a trouble may occur in smooth movement of the feeler after a long term use. The rectilinear moving mechanism is partly used in the devices as disclosed in Japanese Patent Publications No. JP-A-2001-174252, and No. JP-A-2006-350264 (US2005/275802).

Moreover, in recent years, demand for eyeglass frames having a large deflection (highly curved frames) has increased. For this reason, it has been desired that even the highly curved frame can be stably measured in such a manner that the feeler may not deviate from the rim groove.

SUMMARY OF THE INVENTION

A technical object of the invention is to provide an eyeglass frame shape measuring apparatus which can stably and accurately measure a shape of a rim of an eyeglass frame, while a feeler is unlikely to deviate from a groove of the rim even in case of measuring a highly curved frame, and smooth movement of the feeler can be maintained during a long term use.

In order to attain the above described object, an eyeglass frame shape measuring apparatus according to the invention has the following features.

(1) An eyeglass frame shape measuring apparatus for measuring a three-dimensional shape of a rim of an eyeglass frame, the apparatus comprising:
a frame holding unit which holds the frame in a desired position;
a rotary base which is relatively rotated with respect to the held frame;
a feeler holding unit which comprises a support shaft to which a feeler to be inserted into a groove of the rim at a time of measurement is attached, a first arm for holding the support shaft, an elastic body for urging the first arm so that the support shaft is urged outward with respect to a rotation center axis of the rotary base, and a first arm holding unit for holding the first arm so as to enable the support shaft to be inclined with respect to the rotation center axis, the feeler holding unit being provided on the rotary base;
a detecting unit which detects movement of the first arm, and
an arithmetic unit which obtains a three-dimensional movement position of the feeler to obtain the three-dimensional shape of the rim, on the basis of rotation of the rotary base and results of detection of the detecting unit.

(2) The eyeglass frame shape measuring apparatus according to (1), wherein
the first arm holding unit comprises a second arm which holds the first arm so that the first arm can rotate in a radial direction of the rim around a first pivot and is provided on the rotary base so as to rotate in a vertical direction around a second pivot, and
the detecting unit comprises a first rotation detecting unit for detecting rotation of the first arm around the first pivot with respect to the second arm, and a second rotation detecting unit for detecting rotation of the second arm around the second pivot.

(3) The eyeglass frame shape measuring apparatus according to (2) further comprising a second arm fixing unit having a fixing member for fixing a rotation angle of the second arm at a predetermined angle.

(4) The eyeglass frame shape measuring apparatus according to (1), wherein
the first arm holding unit comprises a second arm which holds the first arm so that the first arm can rotate in a radial direction of the rim around a first pivot and is provided on the rotary base so as to rotate in a vertical direction around a second pivot, and
the elastic body is a spring which is provided between the first arm and the second arm so as to urge the first arm in a direction away from the rotation center axis.

(5) The eyeglass frame shape measuring apparatus according to (4), wherein the feeler holding unit is provided at the second arm with a balancing mechanism which is arranged at an opposite side to the first arm with respect to the second pivot and generates an urging force for raising the first arm to attain balance in mass of vertical movement of the first arm.

(6) The eyeglass frame shape measuring apparatus according to (4), wherein the feeler holding unit is provided at the first arm with a balancing mechanism which is arranged at an opposite side to the support shaft with respect to the first pivot to attain balance in mass of rotation of the first arm around the first pivot.

(7) The eyeglass frame shape measuring apparatus according to (1), wherein when the feeler is positioned at a level of a mounting plane of the held frame, the feeler is attached to the support shaft so as to be inclined upwardly by 3 to 10 degree with respect to the mounting plane.

DETAILED DESCRIPTION OF PREFERRED EMBODIMENTS

Figure 1:
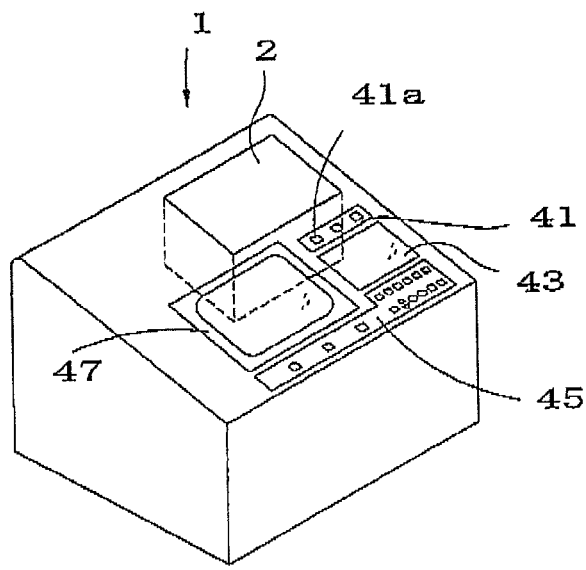
FIG. 1 is a schematic outside view of an eyeglass lens processing apparatus having an eyeglass frame shape measuring apparatus according to an embodiment of the invention.

Now, embodiments of the invention will be described with reference to the drawings. FIG. 1 is a schematic outside view of an eyeglass lens processing apparatus 1 having an eyeglass frame shape measuring apparatus 2 according to the embodiment of the invention. In a rightward depth in an upper part of the apparatus 1, there is incorporated the apparatus 2 for measuring a three-dimensional shape of a rim (a lens frame) of an eyeglass frame F, a template (a pattern), a dummy lens (a model lens), etc. In front of the apparatus 2, there are arranged a switch panel 41 having switches for operating the apparatus 2, a display 43 for displaying processing information or the like, and a switch panel 45 having switches for operating the apparatus 1. By operating this switch panel 45, input of processing conditions or the like, instruction for processing and so on are conducted. Processing of an eyeglass lens is performed by a processing mechanism inside a processing room behind an opening window 47. It is to be noted that a known mechanism as disclosed in Japanese Patent Publication No. JP-A-2001-18155 (U.S. Pat. No. 6,478,657) can be used as the processing mechanism.

The apparatus 2 comprises a frame holding unit 100 for holding the frame F in a desired state, and a measuring mechanism 200 which is provided below the frame holding unit 100.

Figure 2:
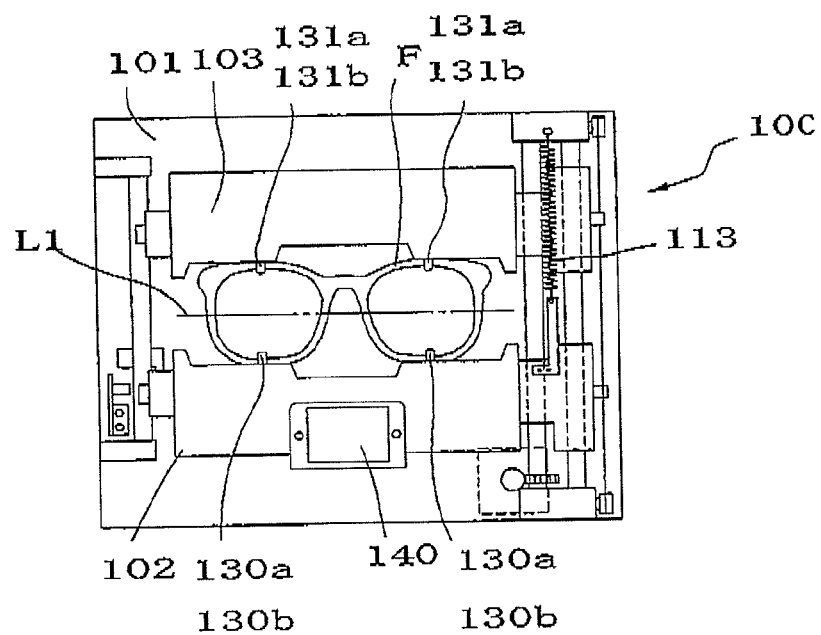
FIG. 2 is a view of a frame holding unit in a state where an eyeglass frame is held, as seem from above.

FIG. 2 is a view of the frame holding unit 100 in a state where the frame F is held, as seen from above. Sliders 102 and 103 for substantially horizontally holding the frame F are provided on a base 101. The sliders 102 and 103 are arranged so as to slide symmetrically with respect to a reference line L1 at a center between them, and are pulled by a spring 113 in a direction toward a center line (the reference line L1) between them.

Clamp pins 130a and 130b for clamping the rim of the frame F from above and below are respectively provided at two positions of the slider 102. In the same manner, clamp pins 113a and 131b for clamping the rim of the frame F from above and below are respectively provided at two positions of the slider 103. Moreover, when the template is measured, the sliders 102, 103 are set free, and a known template holding tool is fitted to a fitting part 140 to be used. It is to be noted that the known frame holding units as disclosed in Japanese Patent Publication No. JP-A-2000-317617 (U.S. Pat. No. 6,325,700) etc. can be used as the frame holding unit 100.

Figure 3:
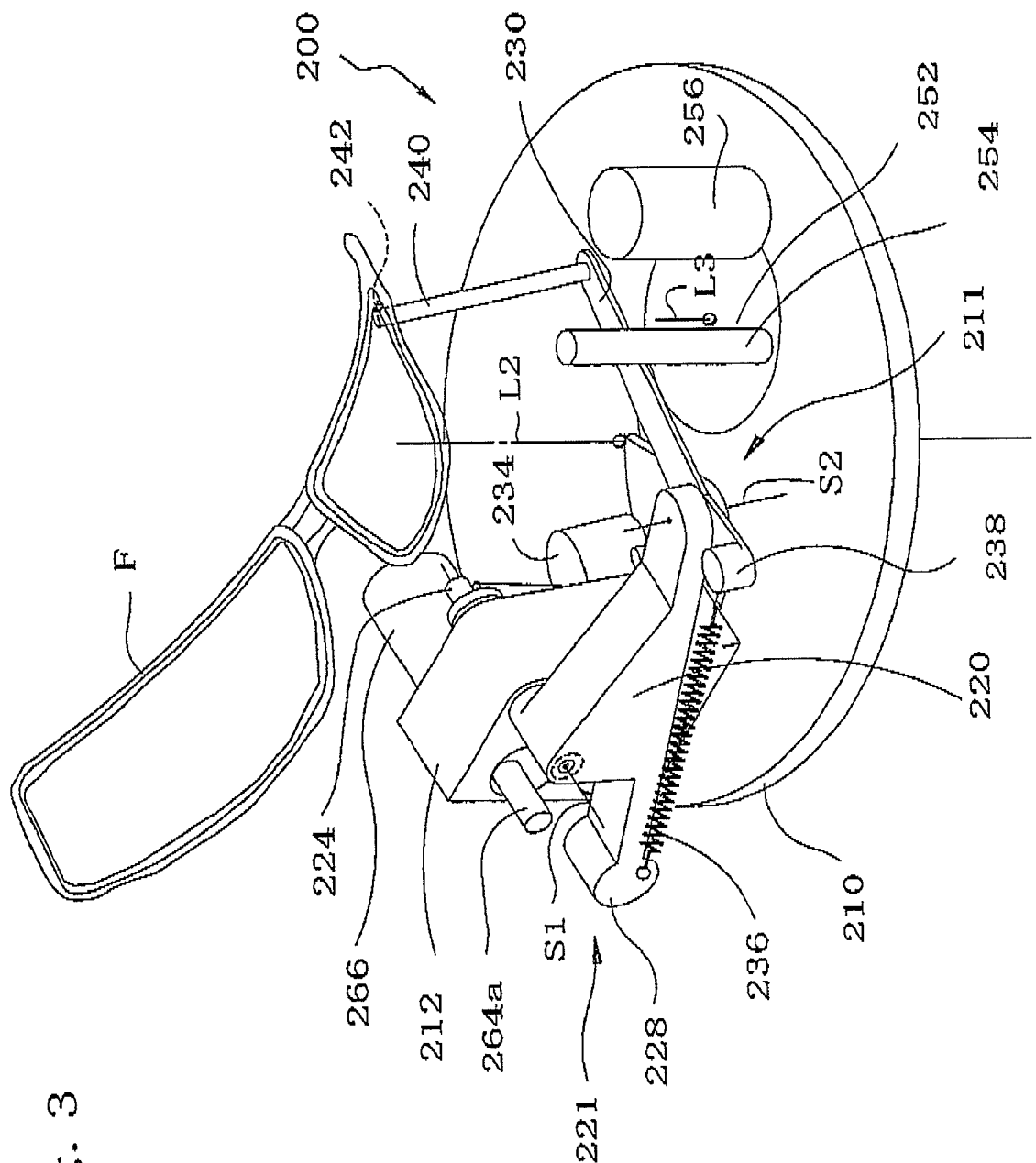
FIG. 3 is a perspective view of a measuring mechanism.
Figure 4:
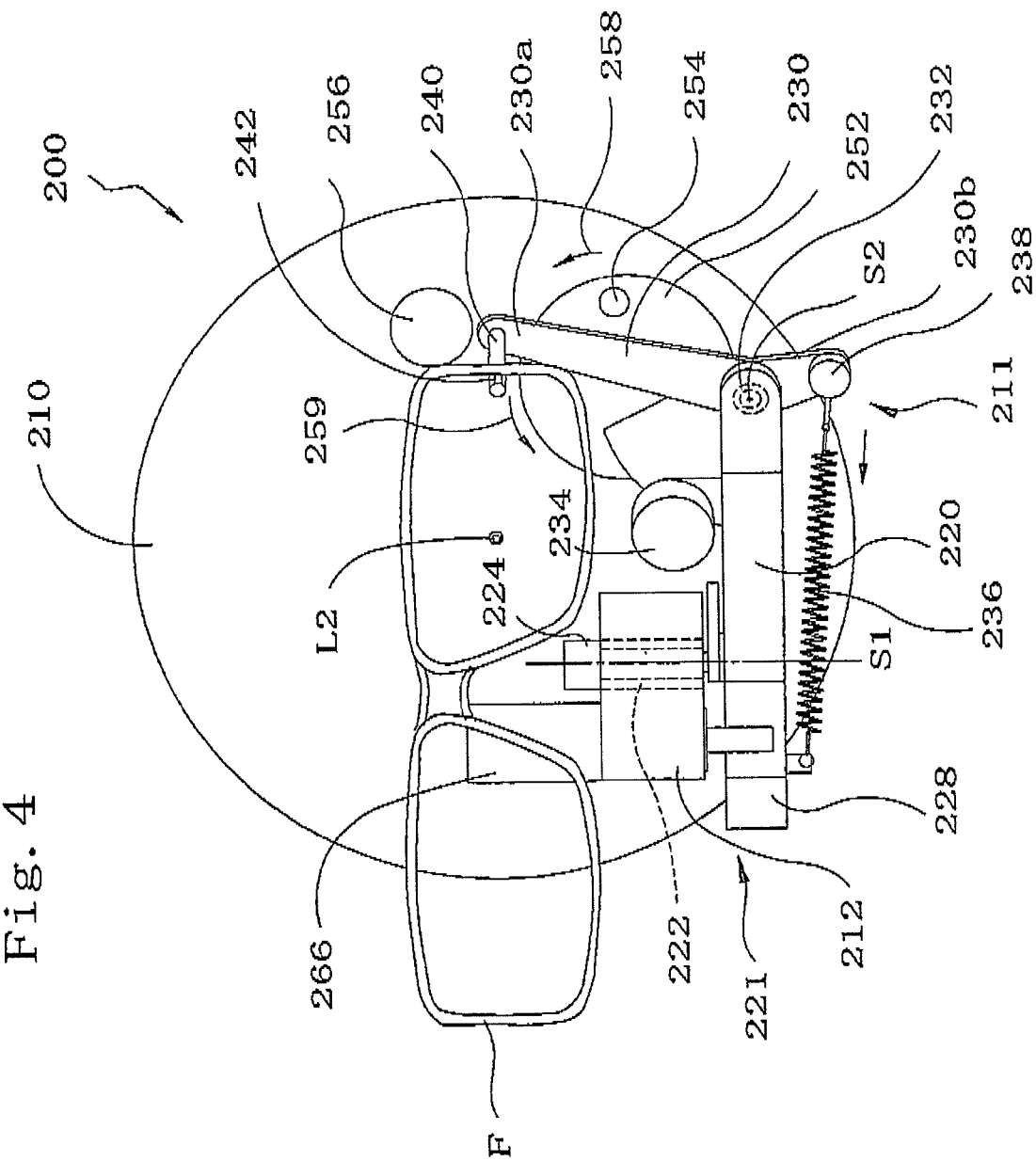
FIG. 4 is a view of the measuring mechanism, as seen from above.
Figure 5:
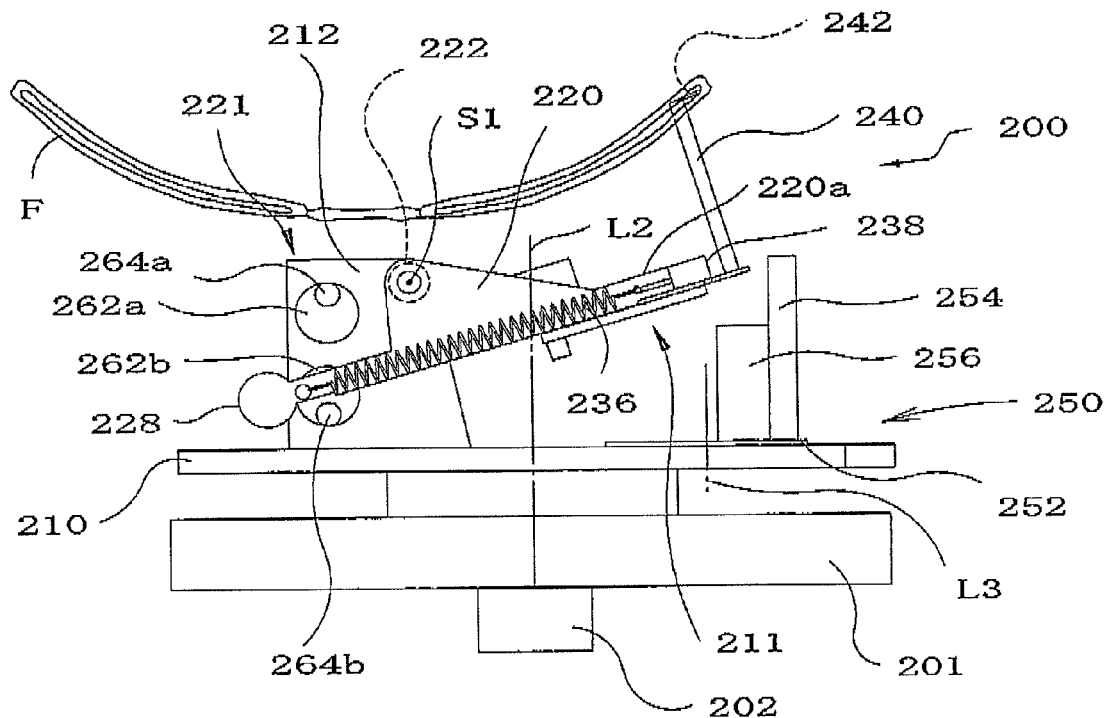
FIG. 5 is a side view of the measuring mechanism.

FIG. 3 is a perspective view of the measuring mechanism 200. FIG. 4 is a view of the measuring mechanism 200, as seen from above. FIG. 5 is a side view of the measuring mechanism 200. In the drawings, the frame holding unit 100 is omitted, although the frame F is shown in a state held in the desired state (in a substantially horizontal position) by the frame holding unit 100.

A rotary base 210 is held by a laterally sliding base 201 so as to rotate around a substantially vertical axis L2. In a state where the frame F is held, the laterally sliding base 201 is moved in a lateral direction of the frame F by a moving mechanism which is not shown. FIGS. 3 to 5 show a state of measuring a right rim of the frame F, and the laterally sliding base 201 is moved to a left rim side in the case of measuring a left rim of the frame F. The rotary base 210 is rotated around the axis L2 by a rotating mechanism 202 having a pulse motor etc. which is attached to the laterally sliding base 201. In this embodiment, the measuring mechanism 200 is rotated around the axis L2 with respect to the frame F which is held by the frame holding unit 100. However, it is also possible to rotate the frame F which is held by the frame holding unit 100 with respect to the measuring mechanism 200.

A feeler holding unit 211 having the following structure is provided on the rotary base 210. An arm 220 (a second arm) is held so as to rotate in a vertical direction around a pivot (an axis) S1 through a bearing 222, on a block 212 which is fixed to the rotary base 210. A rotation angle (a rotation amount) of the arm 220 is detected by an encoder 224 (a detecting unit) which is mounted to the block 212 through a known rotation transmitting mechanism including gears, pinions, and so on.

An arm 230 (a first arm) is held on a distal end 220a of the arm 220 so as to rotate around a pivot (an axis) S2 which is perpendicular to the pivot S1, through a bearing 232. A rotation angle (a rotation amount) of the arm 230 is detected by an encoder 234 (a detecting unit) which is mounted to the arm 220 through a known rotation transmitting mechanism including gears, pinions, and so on.

A distal end 230a of the arm 230 extends from the pivot S2 in a direction where the rotation center axis L2 of the rotary base 210 is located. An upwardly extending support shaft 240 is fixed to the distal end 230a. In this embodiment, the support shaft 240 is so arranged as to extend upwardly in a substantially vertical direction with respect to a plane in which the arm 230 is rotated. The support shaft 240 is so arranged as to substantially pass the rotation center axis L2 of the rotary base 210, when the arm 230 is rotated around the pivot S2. A feeler (a stylus) 242 to be abutted against (inserted into) a groove of the rim of the frame F is attached to an upper part of the support shaft 240. The feeler 242 in this embodiment is attached to an upper end of the support shaft 240 in such a manner that it extends in a needle-like shape from a center of the support shaft 240, and its tip end 242a is directed in a substantially tangential direction of a rotation circular path of the support shaft 240.

Figure 6:
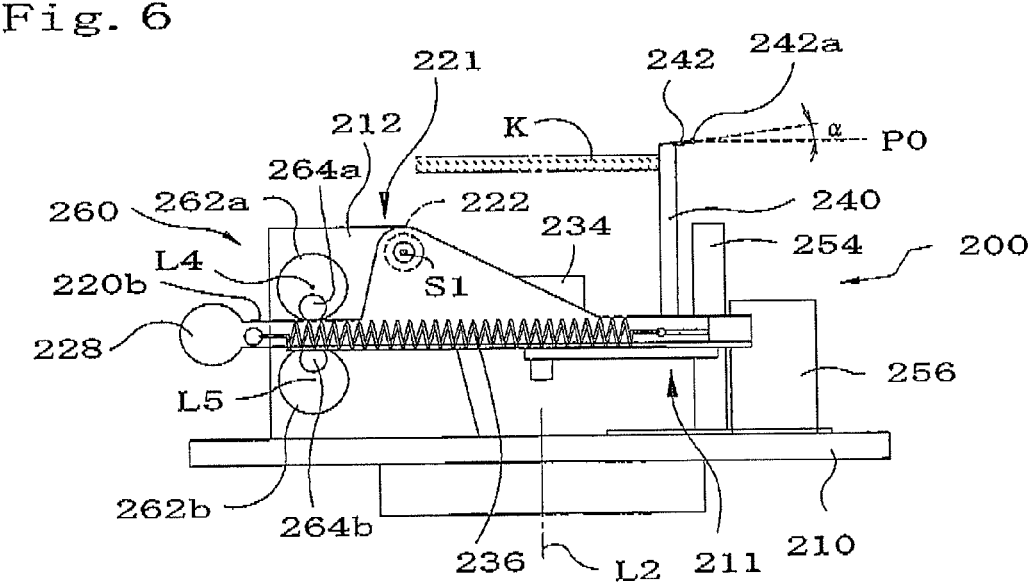
FIG. 6 is a side view of the measuring mechanism in a state where a tip end of a feeler is placed on a level (a height) of a measuring reference plane (a mounting plane) of the frame.

FIG. 6 is a side view of the measuring mechanism 200 in a state where the tip end 242a of the feeler 242 is placed on a level (a position) P0 of a measuring reference plane (amounting plane) of the frame F which is held by the frame holding unit 100. The drawing shows this apparatus when the support shaft 240 is held substantially vertically with respect to the measuring reference plane. When the support shaft 240 is held substantially vertically, the tip end 242a of the feeler 242 is not parallel to the measuring reference plane, but extends from the center of the support shaft 240 so as to be inclined at an angle α of about 3 to 10 degree. In this manner, the feeler 242 becomes unlikely to deviate from the rim groove, even in case where the frame F is a highly curved frame.

In order to measure the three-dimensional shape of the rim with high precision, it is desirable that the feeler 242 is pressed against the rim groove with an appropriate and substantially constant pressure (a measuring pressure). For this reason, in this apparatus, a spring (an elastic body) 236 for urging the feeler 242 toward the rim groove side is provided as a measuring pressure applying mechanism. As the spring 236, a tensile spring having a substantially constant urging force is used. The spring 236 is provided between a backward end 230b of the arm 230 and a backward end 220b of the arm 220. The tip end 242a of the feeler 242 is urged by the spring 236 in a direction away from the rotation center axis L2 of the rotary base 210 (outward direction) along the circular path around the pivot S2, thereby to be a butted against the rim groove. The measuring pressure applying mechanism may be so constructed that the urging force for rotating the arm 230 is applied by a coil spring which is provided around the pivot S2.

A first arm holding unit 221 for holding the arm 230 comprises the aforesaid block 212, the arm 220, and so on. The support shaft 240 which is fixed to the arm 230 is so adapted as to be inclined with respect to the rotation center axis L2 of the rotary base 210 by the first arm holding unit 221, so that the feeler 242 may move along the rim groove.

In this state, when the rotation plane of the arm 230 is included from the substantially horizontal position following the rotation of the arm 220 in the vertical direction around the pivot S1, the distal end 230a of the arm 230 is affected by gravity. In this case, the measuring pressure applied to the feeler 242 will change, even though the urging force of the spring 236 is substantially constant. As a countermeasure, a weight 238 as a balancing mechanism is attached to the backward end 230b of the arm 230. Because the arm 230 is substantially balanced in mass with respect to the pivot S2 by the weight 238, the measuring pressure to be applied to the feeler 242 can be kept substantially constant, irrespective of the rotation of the arm 220 in the vertical direction.

In the same manner, a weight 228 as a balancing mechanism is attached to the backward end 220b of the arm 220, in order to keep balance in mass of the vertical movement (rotation in the vertical direction) of the arm 220 around the pivot S1 to be substantially constant. As the mechanism for keeping the balance in mass, it is possible to employ a structure of using a driving force generated by a spring, a motor and so on which can apply an urging force. Further, as will be described below, considering a moment N of a force to be exerted on the feeler 242 at a time of measuring in the case where the balance in mass of the vertical movement of the arm 220 is made substantially constant, it is desirable to constitute a vertical movement balancing mechanism in such a manner that the load for substantially canceling the moment is adjusted.

A moving mechanism (a rotation force applying unit) 250 for moving the arm 230 around the pivot S2 toward the rotation center axis L2 of the rotary base 210 against the urging force of the spring 236 is provided on the rotary base 210. The moving mechanism 250 includes a round member 252 which is mounted on the rotary base 210 so as to rotate around a substantially vertical axis L3, a shaft 254 which extends upwardly at a position offset from the rotation center axis L3 of the round member 252, and a motor 256 for rotating the round member 252 around the axis L3. When the round member 252 is driven to rotate by the motor 256, and the shaft 254 which is located in a retreated position is rotated in a direction of an arrow mark 258 in FIG. 4, the shaft 254 is brought into contact with a side face of the arm 230. When the shaft 254 is further rotated around the axis L3 following the rotation of the round member 252, the arm 230 is rotated around the pivot S2 against the urging force of the spring 236, whereby the feeler 242 is separated (moved away) from the rim groove of the frame F.

For the purpose of fixing the arm 220 at a predetermined rotary position, enabling the arm 230 to rotate in a substantially horizontal direction, and maintaining the support shaft 240 substantially vertically with respect to the rotation plane of the rotary base 210, an arm fixing unit 260 having the following structure is provided at the backward end 220b of the arm 220. Specifically, rotary members 262a and 262b are held on the block 212 so as to rotate respectively around two axes L4 and L5 which are positioned above and below the backward end 220b of the arm 220. A clamp member (a fixing member) 264a is fixed to the rotary member 262a at a position offset from the axis L4. In the same manner, a clamp member (a fixing member) 264b is fixed to the rotary member 262b at a position offset from the axis L5. The rotary members 262a and 262b are driven to rotate by a motor 266 in association, by a rotation transmitting mechanism which is not shown in the drawings. Following rotations of the rotary members 262a and 262b, the clamp members 264a and 264b are rotated around the axes L4 and L5, whereby a distance between them is reduced, as shown in FIG. 6. In this manner, the backward end 220b of the arm 220 is clamped between the clamp members 264a and 264b, whereby the arm 220 is fixed in a substantially horizontal position. Accordingly, the support shaft 240 is maintained substantially vertically with respect to the rotation plane of the rotary base 210 by the clamp members 264a and 264b. Because the support shaft 240 is maintained substantially vertically, the feeler 242 is placed at a level of the measuring reference plane in the vertical direction (in a direction of height).

In measuring a template K, the support shaft 240 is abutted against a peripheral edge of the template K to serve as the feeler. At a time of measuring the template K, the rotation of the arm 220 is fixed by the arm fixing unit 260, as shown in FIG. 6. In this state, the arm 230 is moved toward the rotation center axis L2 of the rotary base 210 by the moving mechanism 250, whereby the support shaft 240 is abutted against a side face of the template K, and a shape of the template K is measured. It is to be noted that the template K is held by the frame holding unit 100 by means of a template holding tool which is not shown.

Figure 7:
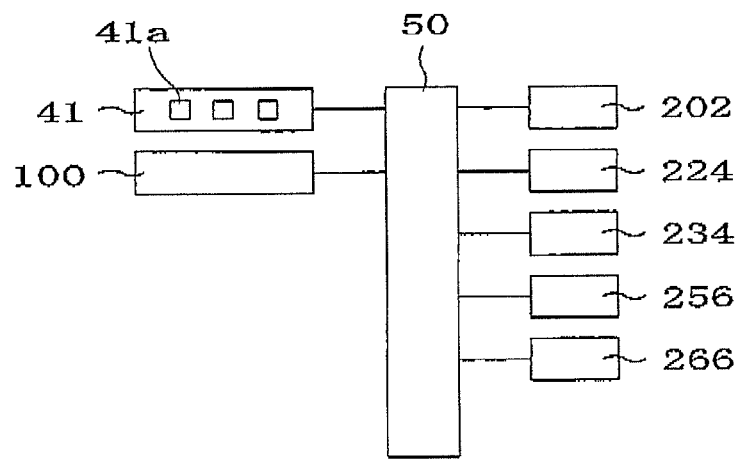
FIG. 7 is a schematic block diagram of a control system of the device.

Then, referring to a schematic block diagram of a control system of the apparatus in FIG. 7, measuring operation of the apparatus having the above described structure will be described. It is to be noted that in an initial state before measurement of the rim starts, the backward end 220b of the arm 220 is clamped between the clamp members 264a and 264b (See FIG. 6), and the feeler 242 is placed at the level of the measuring reference plane. At the same time, the arm 230 is driven to rotate by the motor 256 in a direction of an arrow mark 259 in FIG. 4, and the feeler 242 is placed at the initial position near the rotation center axis L2 of the rotary base 210

When the frame F is held by the frame holding unit 100, as shown in FIG. 2, and a switch 41a for tracing both eyes on the switch panel 41 is pressed, the measuring mechanism 200 is driven by an arithmetic and control unit 50, and measurement of the right rim is first started.

When the shaft 254 is driven by the motor 256 to slowly move to the retreated position, in association with this movement, the arm 230, the support shaft 240, and the feeler 242 are rotated toward the rim groove with the urging force of the spring 236. Then, the feeler 242 is inserted into the rim groove of the frame F which is placed at the level of the measuring reference plane, by the clamp pins 130a, 130b, 131a, 131b of the frame holding unit 100. After the shaft 254 has been moved to the retreated position by the motor 256, the clamp members 264a and 264b which have clamped the backward end 220b of the arm 220 are moved by the motor 266, whereby the distance between the clamp members 264a and 264b becomes the largest, as shown in FIG. 5. In this manner, restriction of the rotation of the arm 220 in the vertical direction is released, and the feeler 242 is permitted to move in the vertical direction along the rim groove of the frame F. Moreover, because the shaft 254 has been moved to the retreated position, the feeler 242 is abutted against the rim groove with a substantially constant measuring pressure by the urging force of the spring 236

In this state, the rotary base 210 is rotated around the axis L2 by the rotating mechanism 202, whereby the feeler 242 is moved in the vertical direction along the rim groove of the frame F and in a direction away from the rotation center axis L2 of the rotary base 210. Accordingly, the arm 220 is rotated around the pivot St, and the arm 230 is rotated around the pivot S2. The rotation angle of the arm 220 is detected by the encoder 224, and the rotation angle of the arm 230 is detected by the encoder 234. On the basis of these detected information and the rotation angle Θn of the rotary base 210, the three-dimensional shape of the rim is computed by the arithmetic and control unit 50. The rotation angle Θn of the rotary base 210 can be obtained by the arithmetic and control unit 50 from driving pulses of the pulse motor in the rotating mechanism 202.

Figure 8:
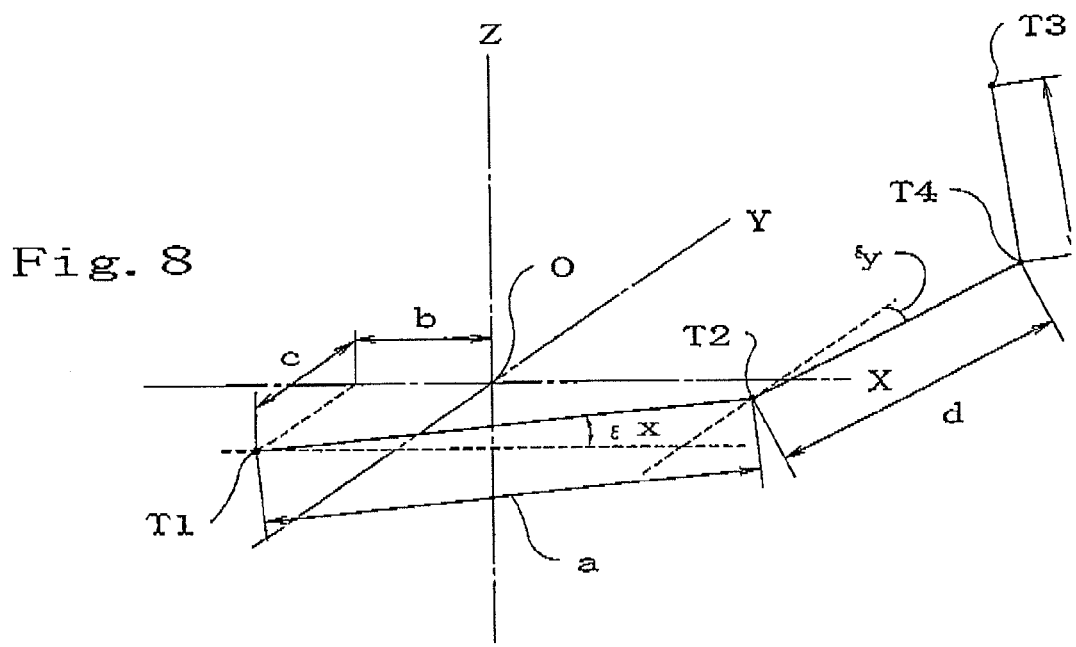
FIG. 8 is a view for explaining a manner of obtaining a three-dimensional shape of a rim of the frame.

Referring to FIG. 8, a manner of obtaining the three-dimensional shape of the rim on the basis of the respective rotation angles of the arms 220 and 230 which have been detected by the encoders 224 and 234 and the rotation angle of the rotary base 210 will be described.

In FIG. 8, provided that the origin point O is positioned on the rotation center axis L2 of the rotary base 210, the three-dimensional coordinate system of X, Y, Z at a certain rotation angle of the rotary base 210 is considered. Provided that the rotation center of the arm 220 is positioned on an XY plane through which an X axis and a Y axis relative to the origin point O pass, the rotation center is set to be a point T1. Moreover, the rotation center of the arm 230 is set to be a point T2. Then, the tip end 242a of the feeler 242 is set to be a point T3, and a point of intersection when the normal is extended from the point T3 up to the plane on which the arm 230 is rotated around the point T2 is set to be a point T4.

In FIG. 8, a distance a is set from the point T1 to the point T2, a distance b is set from the point T1 to the origin point O in a direction of the X axis, a distance c is set from the point T1 to the origin point O in a direction of the Y axis, a distance d is set from the point T2 to the point T4, and a distance e is set from the point T3 to the point T4. Moreover, an angle where a line segment T1-T2 of the arm 220 is inclined with respect to the X axis in the vertical direction (the direction of the Z axis) is set to be εx, and an angle where a line segment T2-T4 of the arm 230 is inclined with respect to the Y axis is set to be εy. The angle εX is the angle obtained by the encoder 224, and the angle εy is the angle obtained by the encoder 234.

A coordinate of the point T3 which is the tip end 242a of the feeler 242 can be obtained from the following operation.

$$X=(a+d \sin \epsilon y)\cos \epsilon x - e \sin \epsilon x - b$$

$$Y=d \cos \epsilon y - c$$

$$Z=(a+d \sin \epsilon y)\sin \epsilon x + e \cos \epsilon x$$

In case where the point T3 represented by the above described coordinate system of X, Y is converted into a polar coordinate system which is represented by a length of a radius r and an angle of the radius ρ relative to the origin point O, the point T3 is represented by the following formula.

$$r = \sqrt{X^2 + Y^2}$$

-continued $$\rho = \tan^{-1}\frac{X}{Y}.$$

The above described operation is based on the case where the rotary base 210 is fixed. In case where the rotation angle Θn (n=1, 2, . . . N) of the rotary base 210 is considered, provided that the three-dimensional shape of the rim is (Rn, θn, Zn) (n=1, 2, . . . N), the radius Rn when the rotation angle is Θn is obtained by r, the angle θn is obtained by (ρ+Θn), and the position Zn in the vertical direction (in the direction of height) is obtained by Z. The three-dimensional shape (Rn, θn, Zn) of the rim which has been obtained in this manner is stored in a memory (not shown) which is connected to the arithmetic and control unit 50, and called up for use from the memory, when the peripheral edge of the eyeglass lens is processed.

As described above, according to the invention, the movements of the feeler 242 in both the vertical direction and the radial direction are controlled by the mechanism which is moved through the circular movement, and therefore, it is possible to use the bearings 222 and 232 such as radial bearings which can perform smooth rotation and has high sealing performance. As the results, the smooth movements of the feeler 242 in both the vertical direction and the radial direction can be maintained during a long term use, and the three-dimensional shape of the rim of the eyeglass frame can be accurately measured.

Moreover, according to the above described structure, the feeler 242 is more unlikely to deviate from the rim groove, even when the eyeglass frame having a large warp (the highly curved frame) is measured, as compared with the structure of the above described conventional device, and it is possible to measure the three-dimensional shape of the rim of the eyeglass frame stably and accurately. The reason will be described below.

Figure 9A:
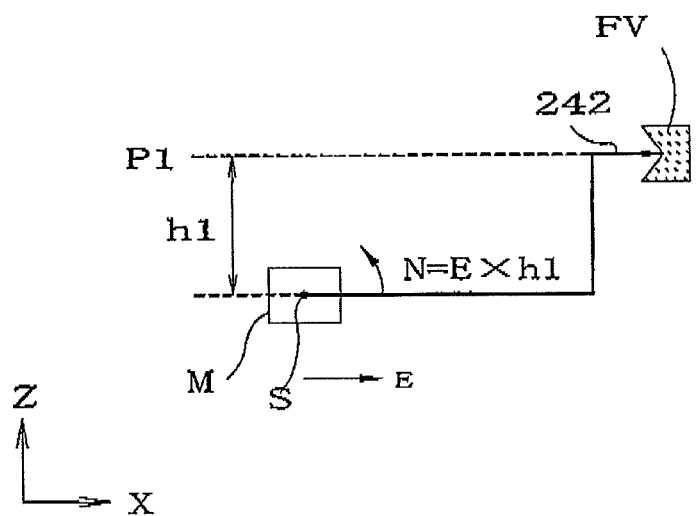
FIGS. 9A, 9B and 9C are views for explaining reason why the feeler is unlikely to deviate from a groove of the rim in measuring a highly curved frame.
Figure 9B:
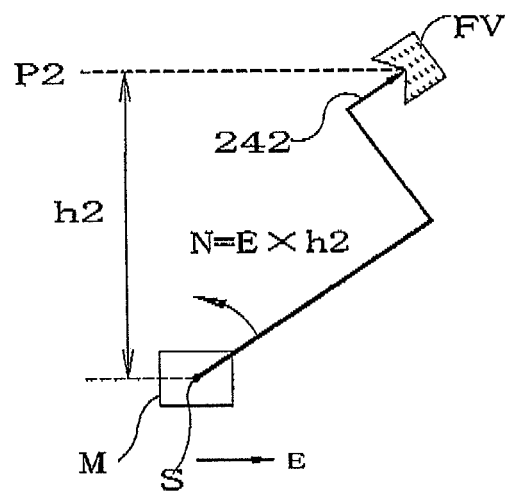

FIGS. 9A and 9B show a structure in which the feeler 242 abutted against the rim groove FV is rotated around the pivot S only in the vertical direction (vertical movement), and a moving body M supporting the pivot S is moved in the radial direction (a lateral direction in the drawings: an X direction), in the same manner as in Japanese Patent Publication No. JP-A-2001-174252. Considering a moment N of a force to be exerted on the feeler 242, the moment N is the product of a force (a measuring pressure) E and a distance h in a direction substantially perpendicular to a direction of the force E. In short, $$N=E \times h$$

FIG. 9A shows the case where the rim groove FV is at a position P1 of the reference plane. Because a constant force (the measuring pressure) E is generated in the X direction, the moment N of the force in this case is $$N=E \times h1$$

On the other hand, FIG. 9B shows the case where the frame F is highly curved, and the rim groove FV is at a position P2 which is higher than the position P1 of the reference plane. In this case too, a constant force (the measuring pressure) E is generated in the X direction, and the moment N of the force is $$N=E \times h2$$

As compared with the case of FIG. 9A, higher the rim groove FV is positioned, larger the moment N of the force becomes. As the moment N of the force becomes larger, the feeler 242 is more likely to deviate upwardly.

Figure 9C:
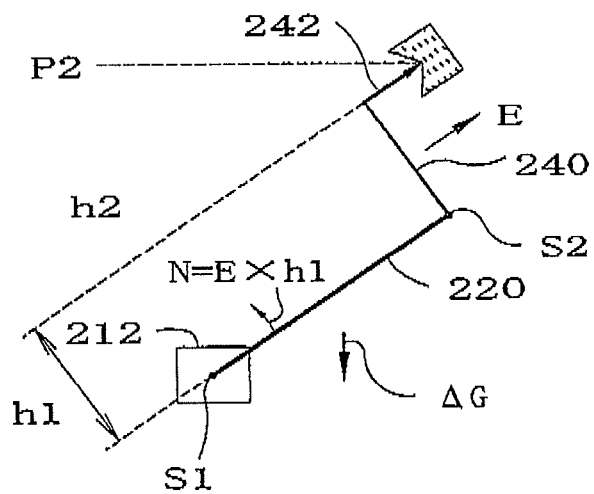

In contrast, FIG. 9C shows the case of the apparatus in this embodiment. The feeler 242 is rotated in the vertical direction around the pivot S1 (the vertical movement), and the pivot S1 is supported by the fixed block 212. The movement of the feeler 242 in the radial direction (the X direction) is performed by the arm 230 (not shown in FIG. 9C) which is rotated around the pivot S2 at the distal end side of the arm 220. The force (the measuring pressure) E to be exerted on the feeler 242 is generated by the spring 236 in a direction of a plane where the feeler 242 is rotated around the pivot S2. In this case, a distance h1 in a direction substantially perpendicular to the direction of the force E is substantially constant irrespective of the height of the rim groove FV (the position of the tip end 242a of the feeler 242), and therefore, the moment N of the force is also substantially constant, because $N = E \times h1$. Accordingly, even though the frame F is highly curved, and the level of the rim groove FV is high, the feeler 242 is unlikely to deviate from the rim groove FV, since the moment N of the force is substantially constant. As the results, stable and accurate measurement can be performed.

Moreover, considering that the moment N of the force to be exerted on the feeler 242 in an upward direction is substantially constant, it is desirable that a load $\Delta G$ is applied in a downward direction so as to substantially cancel the moment. In this manner, the feeler 242 is more unlikely to deviate from the rim groove FV. In the embodiment as shown in FIGS. 3 to 5, this is realized by providing a vertical movement balancing mechanism in which the load $\Delta G$ is adjusted so that the balance in mass may be substantially attained with respect to the mass of the weight 228 which is attached to the backward end 220b of the arm 220. In this case, instead of using the weight 228, it is possible to employ a driving force generated by a spring, a motor, etc. which can apply an urging force.

Further, according to the embodiment, the measuring pressure E is exerted in a substantially horizontal direction in case where the rim groove FV of the frame F which is held by the frame holding unit 100 is at the level of the measuring reference plane (the mounting plane), and according to an extent that the position of the rim groove FV becomes higher, the direction of the measuring pressure E also varies in the upward direction. In short, the measuring pressure E is exerted in a direction along a curve of the frame F. As the results, measurement with high precision can be realized.

What is claimed is:

1. An eyeglass frame shape measuring apparatus for measuring a three-dimensional shape of a rim of an eyeglass frame, the apparatus comprising:
    a frame holding unit which holds the frame in a desired position;
    a rotary base which is relatively rotated with respect to the held frame;
    a feeler holding unit which comprises a support shaft to which a feeler to be inserted into a groove of the rim at a time of measurement is attached, a first arm for holding the support shaft, an elastic body for urging the first arm so that the support shaft is urged outward with respect to a rotation center axis of the rotary base, and a first arm holding unit for holding the first arm so as to enable the support shaft to be inclined with respect to the rotation center axis, the feeler holding unit being provided on the rotary base;
    a detecting unit which detects movement of the first arm; and
    an arithmetic unit which obtains a three-dimensional movement position of the feeler to obtain the three-dimensional shape of the rim, on the basis of rotation of the rotary base and results of detection of the detecting unit.

2. The eyeglass frame shape measuring apparatus according to claim 1, wherein
    the first arm holding unit comprises a second arm which holds the first arm so that the first arm can rotate in a radial direction of the rim around a first pivot and is provided on the rotary base so as to rotate in a vertical direction around a second pivot, and
    the detecting unit comprises a first rotation detecting unit for detecting rotation of the first arm around the first pivot with respect to the second arm, and a second rotation detecting unit for detecting rotation of the second arm around the second pivot.

3. The eyeglass frame shape measuring apparatus according to claim 2 further comprising a second arm fixing unit having a fixing member for fixing a rotation angle of the second arm at a predetermined angle.

4. The eyeglass frame shape measuring apparatus according to claim 1, wherein
    the first arm holding unit comprises a second arm which holds the first arm so that the first arm can rotate in a radial direction of the rim around a first pivot and is provided on the rotary base so as to rotate in a vertical direction around a second pivot, and
    the elastic body is a spring which is provided between the first arm and the second arm so as to urge the first arm in a direction away from the rotation center axis.

5. The eyeglass frame shape measuring apparatus according to claim 4, wherein the feeler holding unit is provided at the second arm with a balancing mechanism which is arranged at an opposite side to the first arm with respect to the second pivot and generates an urging force for raising the first arm to attain balance in mass of vertical movement of the first arm.

6. The eyeglass frame shape measuring apparatus according to claim 4, wherein the feeler holding unit is provided at the first arm with a balancing mechanism which is arranged at an opposite side to the support shaft with respect to the first pivot to attain balance in mass of rotation of the first arm around the first pivot.

7. The eyeglass frame shape measuring apparatus according to claim 1, wherein when the feeler is positioned at a level of amounting plane of the held frame, the feeler is attached to the support shaft so as to be inclined upwardly by 3 to 10 degree with respect to the mounting plane.

* * * * *